United States Patent [19]

Chiang et al.

[11] Patent Number: 4,876,329
[45] Date of Patent: Oct. 24, 1989

[54] POLYIMIDE POLYMERS AND COPOLYMERS USING 3,5-DIAMINOBENZOTRIFLUORIDE

[75] Inventors: Weilong L. Chiang; Douglas E. Fjare; Neal R. Nowicki, all of Naperville, Ill.

[73] Assignee: Amoco Corporation, Chicago, Ill.

[21] Appl. No.: 212,508

[22] Filed: Jun. 28, 1988

[51] Int. Cl.[4] ............................................. C08G 69/26
[52] U.S. Cl. .................................... 528/353; 528/172; 528/188; 528/351
[58] Field of Search ................ 528/353, 188, 172, 351

[56] References Cited

U.S. PATENT DOCUMENTS 4,690,999  9/1987  Numata et al. ..................... 528/353

Primary Examiner—John Kight
Assistant Examiner—M. L. Moore
Attorney, Agent, or Firm—Reed F. Riley; William H. Magidson; Ralph C. Medhurst

[57] ABSTRACT

Partially soluble, film-forming polyimides and their copolymers made using 3,5-diaminobenzotrifluoride are described. Thin films and coatings of these materials are relatively colorless and the polymers have a high Tg, excellent thermal stability, lower moisture uptake, and lower dielectric constant. They are useful as films, fibers, molded articles and as protective coatings, inter-level dielectrics, electric circuit substrates and the like for the electronics industry.

8 Claims, No Drawings

POLYIMIDE POLYMERS AND COPOLYMERS USING 3,5-DIAMINOBENZOTRIFLUORIDE

BACKGROUND OF THE INVENTION

This invention relates to soluble, film-forming polyimides and their copolymers made using 3,5-diaminobenzotrifluoride, and, more particularly, to low dielectric constant, high thermal stability, high Tg, partially soluble, lower moisture uptake, relatively colorless polyimides and their copolymers made using 3,5-diaminobenzotrifluoride and a compound selected from the group consisting of aromatic dianhydrides and their corresponding esters and acids.

Aromatic polyimides have found extensive use in industry as composites, molded parts and dielectrics due to their toughness, flexibility, mechanical strength, high thermal stability, their lower dielectric constant, and high electrical resistivity. Such polyimides have been used in both film and coating form as advanced materials for such uses as passivation and insulating coatings, interlevel dielectrics, die attach adhesives, flexible circuit substrates, and the like.

Although current polyimides have the toughness, flexibility and thermal stability necessary to meet the rigorous processing and operating conditions required for certain uses, they do not exhibit the low dielectric constant and reduced moisture uptake shown by lower thermal stability polymers such as polyethylene and polytetrafluoroethylene. The latter polymers, however, are not useful despite their excellent dielectric and moisture uptake properties if the thermal stability requirements are demanding. In addition, polyimides are generally insoluble even in solvents like N-methyl pyrrolidone or dimethylacetamide which inhibits their usefulness in important areas. In addition, polyimides generally do not form colorless films even when film thickness is below about one mil.

Now it has been found that improved polyimides and copolyimides exhibiting most if not all of the above requirements can be found in the group of polyimides or copolyimides made using 3,5-diaminobenzotrifluoride.

SUMMARY OF THE INVENTION

In one aspect, the invention contained herein is directed to a partially soluble, film-forming polyimide or copolyimide made from 3,5-diaminobenzotrifluoride (DABF). In still another aspect, the invention is directed to a partially soluble, film-forming polyimide or copolyimide made from 3,5-diaminobenzotrifluoride and a compound selected from the group consisting of the symmetrical dianhydrides of benzene, biphenyl, diphenylether and benzophenone, 2,2-bis(3,4-dicarboxyphenyl)propane dianhydride and 2,2-bis(3,4-dicarboxyphenyl)hexafluoropropane dianhydride.

DETAILED DESCRIPTION OF THE INVENTION

The polyimides of this invention have a high Tg, preferably greater than about 300° C., high temperature of onset of degradation in nitrogen, preferably above about 450° C., and lower moisture uptake, preferably less than about 2 percent by weight at 100% relative humidity. They are also partially soluble in processing solvents such as N-methylpyrrolidone and dimethylacetamide, preferably to the extent of at least about 1 percent by weight in N-methylpyrrolidone, and transparent and light in color in film thicknesses of about 1 mil, preferably transparent and essentially colorless.

Dianhydrides useful in making the polyimides and copolyimides of this invention include aromatic dianhydrides, preferably the symmetrical dianhydrides of benzene (PMDA), biphenyl (BPDA), diphenyl ether (OPAN), benzophenone (BTDA), 2,2-bis(3,4-dicarboxyphenyl)propane dianhydride (IPAN) and 2,2-bis-(3,4-dicarboxyphenyl) dianhydride (6FDA). More preferably, the polyimides and copolyimides are made from DABF and 2,2-bis(3,4-dicarboxyphenyl propane dianhydride or 2,2-bis(3,4-dicarboxyphenyl)hexafluoropropane dianhydride.

The polyimides are made by dissolving one or more aromatic diamines, preferably polymer grade diamine, in a solvent such as N-methylpyrrolidone or dimethylacetamide and adding one or more dianhydrides at a temperature between about 0° C. and 100° C. to make a solution of the polyamic acid. Desirably, solutions of the polyamic acid from about 5 to about 50 weight percent, more preferably, about 10 to about 20 weight percent are employed. Dimethylacetamide is the preferred solvent in which to make these polyamic acids as it appears to lead to polyimide films with the least color. In general, roughly equal molar portions of the diamine and the dianhydride are used in making the polyamic acid solutions, although a small excess of one or the other component can be used in order to terminate the polymer with either acidic or amine groups to control molecular weight.

The resulting solution of polyamic acid can be spread on a substrate, and the solvent evaporated leaving the polyamic acid in the form of a layer or coating. The coating or film is then heated, preferably in an inert gas such as nitrogen to complete the imidization process. Coatings of the polyimides are desirably thin, preferably between about one and about twenty microns in thickness. Film and coating thickness depend upon the use to which the film or coating is put as can be understood by one skilled in the art.

The polyimides of this invention are useful in making composites, molded articles, optical fibers, etc., and useful too as both free-standing films and coatings in the form of substrates for electrical components, interlevel dielectrics, passivation coatings, and the like.

The following Examples will serve to illustrate certain embodiments of the herein disclosed invention. These Examples should not, however, be construed as limiting the scope of the novel invention as there are many variations which may be made thereon without departing from the spirit of the disclosed invention, as those of skill in the art will recognize.

EXAMPLES

General

All percents used are weight percents. Test procedures used to characterize the polyimides of this invention are as follows.

Dielectric Constant

Dielectric constant measurements were made on thin films (0.7 to 2.0 mils thick) cast from polyamic acid solutions onto glass plates nd thermally cured. The measurements were made using a two-fluid cell technique as described in ASTM D 150. The reproducibility of the dielectric constant measurement using this technique is about 2 percent of the measured value.

Films were dried and stored in a nitrogen-purged dry box prior to testing at 1 MHz to give results at 0% relative humidity.

Moisture Absorption and Change in Dielectric Constant at 40% R.H.

Moisture absorption measurements were made on waferlevel capacitor structures. Three-layer structures of aluminum/polyimide/aluminum were fabricated on silicon wafers according to the processing procedure for three-layer structures set out in U.S. Ser. No. 212,511, filed June 28, 1988. Aluminum thickness was 0.6 microns, polymer thickness was 1 to 2 microns, and capacitor size was 0.01 square centimeters. Capacitance of the structures was measured between 50° C. and 300° C. over a range of frequencies. The capacitors were tested to 300° C., allowed to cool, and immediately reheated to 300° C. The moisture absorption values were calculated based on the difference between the measured 1 MHz dielectric constants at 50° C. for the first and second heats of the test according to the formula:

$$\text{Equilibrium Moisture}(100\% \text{ R.H.}) \approx \frac{2\Delta\epsilon}{0.4}$$

which formula is based upon 2 percent equilibrium moisture per unit change in epsilon, and where $\Delta\epsilon$ is the change in dielectric constant between first and second heat. The start of the first heat is assumed to be at 40% R.H. as the wafers were allowed to equilibrate for two days at 40% R.H. prior to testing. The start of the second heat is assumed to be approximately 0% R.H. as the wafers were reheated immediately after the water was driven off during the first heat. The change in dielectric constant at 40% R.H. is the percent difference between the measured 1 MHz dielectric constants at 50° C. for the first and second heats of the test.

Glass Transition Temperature (Tg)

The glass transition temperature of the polymers was measured by differential scanning calorimetry. Tg measurements were made on thin films cast from polyamic acid solutions onto glass plates and thermally cured.

Temperature of Onset of Degradation in Air and Nitrogen

The temperature of onset of degradation of the polymers was measured by thermogravimetric analysis. The onset temperature is the temperature at which 1 weight percent weight loss is found at a heating rate of 10° C./min. Measurements were made on thin films cast from polyamic acid solutions onto glass plates and thermally cured.

EXAMPLE 1

A 24.8 g sample of 3,5-dinitrobenzotrifluoride purchased from Aldrich Chemical Co. was slurried in 200 ml of ethanol and 5 g of 1% palladium on carbon added. This mixture was transferred to an autoclave, pressured to 400 psi with hydrogen, and heated at 75° C. with stirring for 1 hr. A 91% yield of pure 3,5-diaminobenzotrifluoride was recovered.

EXAMPLE 2

A typical preparation for a polyimide of 3,5-diaminobenzotrifluoride is as follows. Sufficient 3,5-diaminobenzotrifluoride and a dianhyride to yield 10 g of the corresponding polyamic acid (1:1 stoichiometric ratio of diamine to dianhydride) were charged to a stirred, dry reactor vessel followed by sufficient dry, spectrophotometric grade N-methylpyrrolidone to yield a 15% by weight solution (56.67 g). The reaction mixture was stirred under nitrogen at room temperature for approximately ten to sixteen hours.

EXAMPLE 3

A sample of a polyamic solution as made in Example 2 was poured out onto a glass plate and spread with a doctor blade or wire wrapped rod to give a 1–2 mil thick polyimide film after curing. The plate was set in a dry box under nitrogen for 1 hr. After this time, the film is cured for an additional hour at 200° C. and finally at 300° C. for 1 hr. The final cured film was transparent, light colored to yellow in color, and clear and tough. If cured under nitrogen to 300° C., the film is nearly colorless.

EXAMPLE 4

A copolyimide having the composition 1 6FDA: 0.5 DABF: 0.5 ABPB was prepared in the following manner. A 2.457 g amount of DABF and a 5.140 g amount of bis-(p-aminophenoxy)biphenyl (APBP) were dissolved together in 37.5 grams of NMP and reserved. A 12.394 g amount of 6FDA was dissolved in 60.8 grams of NMP in a resin kettle, and the diamine mixture was added slowly to the 6FDA solution, followed by an additional 15.0 grams of NMP. This produced a polyamic acid solution containing 15% solids with an inherent viscosity of 0.94.

EXAMPLE 5

Some physical properties of the polyimides of this invention were measured and set forth in the Table below.

TABLE

Properties of Polyimides of 3,5-Diaminobenzotrifluoride

| Dianhydride | Tg (°C.) | NMP Sol. | Temperature of Onset of Degradation in Nitrogen (°C.) | Moisture Absorption % at 100% R.H. (Wafer Level) | Dielectric Constant at 0% R.H. and 1 MHz |
|---|---|---|---|---|---|
| BPDA | 329 | ps[1] | 510 | 1.2 | 3.35 |
| OPAN | 277 | ps | 485 | — | 3.17 |
| 6FDA | 300 | s[1] | 480 | 0.6 | 2.74 |
| IPAN | 292 | ps | 492 | 0.8 | 2.95 |

[1] s = soluble; ps = partially soluble

What is claimed is:

1. A partially soluble, film-forming polyimide or copolyimide made from 3,5-diaminobenzotrifluoride.

2. A partially soluble, film-forming polyimide or copolyimide made from 3,5-diaminobenzotrifluoride and a compound selected from the group consisting of the symmetrical dianhydrides of benzene, biphenyl, diphenylether, benzophenone, and 2,2-bis(3,4-dicarboxyphenyl)propane dianhydride and 2,2-bis(3,4-dicarboxyphenyl)hexafluoropropane dianhydride.

3. The polyimide or copolymide of claim 2 wherein said compound is a symmetrical dianhydride of benzene, biphenyl, diphenylether, and benzophenone.

4. The polyimide or copolyimide of claim 2 wherein said compound is pyromellitic dianhydride.

5. The polyimide of claim 2 wherein said compound is 3,3',4,4'-biphenyltetracarboxylic acid dianhydride.

6. The polyimide of claim 2 wherein said compound is 3,3',4,4'-oxydiphthalic acid anhydride.

7. The polyimide or copolyimide of claim 2 wherein said compound is 2,2-bis(3,4-dicarboxyphenyl)propane dianhydride.

8. The polyimide or copolyimide of claim 2 wherein said compound is 2,2-bis(3,4-dicarboxyphenyl)hexafluoropropane dianhydride.

* * * * *